(12) United States Patent  (10) Patent No.: US 8,844,487 B2
Min et al.  (45) Date of Patent: Sep. 30, 2014

(54) EXHAUST VALVE CONTROL SYSTEM (75) Inventors: Byounghyouk Min, Hwaseong-si (KR); Ho Chul Kwak, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 52 days.

(21) Appl. No.: 13/543,323

(22) Filed: Jul. 6, 2012

(65) Prior Publication Data

US 2013/0152884 A1  Jun. 20, 2013

(30) Foreign Application Priority Data

Dec. 15, 2011 (KR) .......................... 10-2011-0135702

(51) Int. Cl.
*F01L 1/02* (2006.01)
(52) U.S. Cl.
USPC ...................................................... 123/90.27
(58) Field of Classification Search
CPC ............. F01L 1/04; F01L 1/047; F01L 1/053; F01L 1/0532; F01L 2001/0537; F02B 2275/18; F02B 2075/1832
USPC .................. 123/90.27, 90.15–90.17
See application file for complete search history.

(56) References Cited

U.S. PATENT DOCUMENTS

| 7,204,214 B2 * | 4/2007 | Miyaji et al. ............... 123/90.15 |
| 7,424,874 B2 * | 9/2008 | Takamiya et al. .......... 123/90.16 |
| 2007/0034177 A1 * | 2/2007 | Yoshizaki ..................... 123/54.7 |
| 2007/0193541 A1 * | 8/2007 | Imamura ..................... 123/90.17 |

FOREIGN PATENT DOCUMENTS

| JP | 6-67828 U | 9/1994 |
| JP | 3451638 B2 | 7/2003 |
| JP | 3721466 B2 | 9/2005 |

* cited by examiner

*Primary Examiner* — Hung Q Nguyen
(74) *Attorney, Agent, or Firm* — Morgan, Lewis & Bockius LLP (57) ABSTRACT

An exhaust valve control system of an engine includes a first bank including a plurality of cylinders and a second bank including a plurality of cylinder, in which the angle between the exhaust cam profiles of any two cylinders in the first bank is different by a predetermined angle or more from 180°, and the angle between the exhaust cam profiles of any two cylinders in the second bank is different by a predetermined angle or more from 180°.

7 Claims, 6 Drawing Sheets

EXHAUST VALVE CONTROL SYSTEM

CROSS-REFERENCE TO RELATED APPLICATION

The present application claims priority of Korean Patent Application Number 10-2011-0135702 filed Dec. 15, 2011, the entire contents of which application is incorporated herein for all purposes by this reference.

BACKGROUND OF INVENTION

1. Field of Invention

The present invention relates to an exhaust valve control system, and more particularly, to an exhaust valve control system of an engine with exhaust interference.

2. Description of Related Art

In general, multi cylinder engines are provided with cylinders with an ignition interval of 180° CA (crank angle) in the same bank. Exhaust interference occurs between the cylinders with an ignition interval of 180° CA (crank angle) in the multi cylinder engines. That is, the pressure of an exhaust gas that are ignited and discharged first disturbs scavenging in other cylinders.

The exhaust interference decreases a charging efficiency of a cylinder under the interference and deteriorates low/middle speed performance of the engines.

Although an exhaust manifold that can minimize exhaust interference may be considered to remove the problem, it is difficult to apply an exhaust manifold shaped to minimize exhaust interference, considering the layout of the engine compartments.

Further, an engine that adjusts the profiles of the exhaust cams to be different has been proposed. That is, the profiles of the exhaust cams are adjusted to be different by providing the same cams, which fit on a camshaft, and by machining the camshaft to have different thicknesses. However, it is necessary to perform grinding in consideration of this configuration in machining of the camshaft, such that productivity is deteriorated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a method of determining a phase angle of an exhaust cam having advantages of effectively reducing exhaust interference, and an exhaust cam using the method.

Various aspects of the present invention provide for an exhaust valve control system of an engine including a first bank including a plurality of cylinders and a second bank including a plurality of cylinder, in which the angle between the exhaust cam profiles of any two cylinders in the first bank is different by a predetermined angle or more from 180°, and the angle between the exhaust cam profiles of any two cylinders in the second bank is different by a predetermined angle or more from 180°.

Profiles and lifts of exhaust cams of the plurality of cylinders in the first bank may be the same.

Profiles and lifts of exhaust cams of the plurality of cylinders in the second bank may be the same.

The engine may be an 8-cylinder engine in which the first bank includes first, third, fifth, and seventh cylinders sequentially from the front of the engine and the second bank includes second, fourth, sixth, and eighth cylinders sequentially from the front of the engine, the angle between the exhaust cam profiles of the first cylinder and the seventh cylinder in the first bank may be different by a first predetermined angle and a second predetermined angle or more from 180°, and when the exhaust cam profile of the first cylinder is retarded by the first predetermined angle and the exhaust cam profile of the seventh cylinder is advanced by the second predetermined angle, the angle between the profiles may be 180°.

The engine may be an 8-cylinder engine in which the first bank includes first, third, fifth, and seventh cylinders sequentially from the front of the engine and the second bank includes second, fourth, sixth, and eighth cylinders sequentially from the front of the engine, the angle between the exhaust cam profiles of the fifth cylinder and the third cylinder in the first bank may be different by a first predetermined angle and a second predetermined angle or more from 180°, and when the exhaust cam profile of the fifth cylinder is retarded by the first predetermined angle and the exhaust cam profile of the third cylinder is advanced by the second predetermined angle, the angle between the profiles may be 180°.

The engine may be an 8-cylinder engine in which the first bank includes first, third, fifth, and seventh cylinders sequentially from the front of the engine and the second bank includes second, fourth, sixth, and eighth cylinders sequentially from the front of the engine, the angle between the exhaust cam profiles of the second cylinder and the eighth cylinder in the second bank may be different by a first predetermined angle and a second predetermined angle or more from 180°, and when the exhaust cam profile of the second cylinder is advanced by the first predetermined angle and exhaust cam profile of the eighth cylinder is advanced by the second predetermined angle, the angle between the profiles may be 180°.

The engine may be an 8-cylinder engine in which the first bank includes first, third, fifth, and seventh cylinders sequentially from the front of the engine and the second bank includes second, fourth, sixth, and eighth cylinders sequentially from the front of the engine, the angle between the exhaust cam profiles of the fourth cylinder and the sixth cylinder in the second bank may be different by a first predetermined angle and a second predetermined angle or more from 180°, and when the exhaust cam profile of the fourth cylinder is advanced by the first predetermined angle and the exhaust cam profile of the sixth cylinder is advanced by the second predetermined angle, the angle between the profiles may be 180°.

The present invention can effectively reduce exhaust interference.

The present invention can minimize exhaust interference and improve performance in a low/middle speed section.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
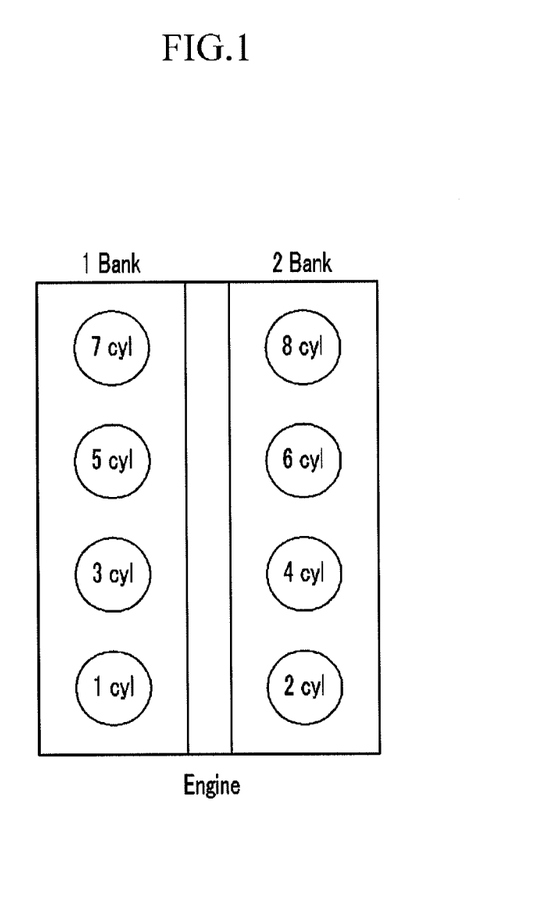
FIG. 1 is a top plan view showing the arrangement of a common 8-cylinder engine.
Figure 2:
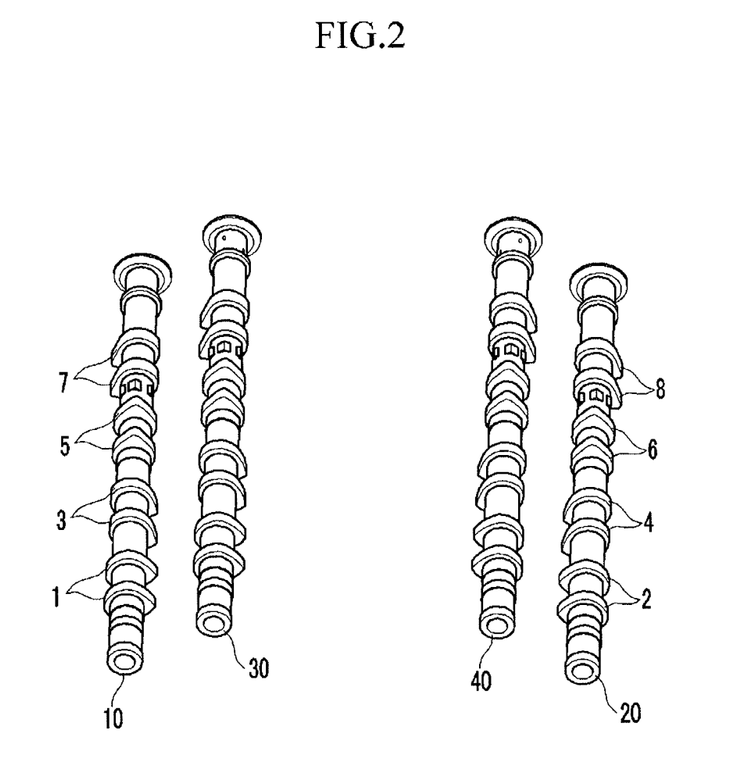
FIG. 2 is a view showing a camshaft and a cam of the 8-cylinder engine of FIG. 1.
Figure 3:
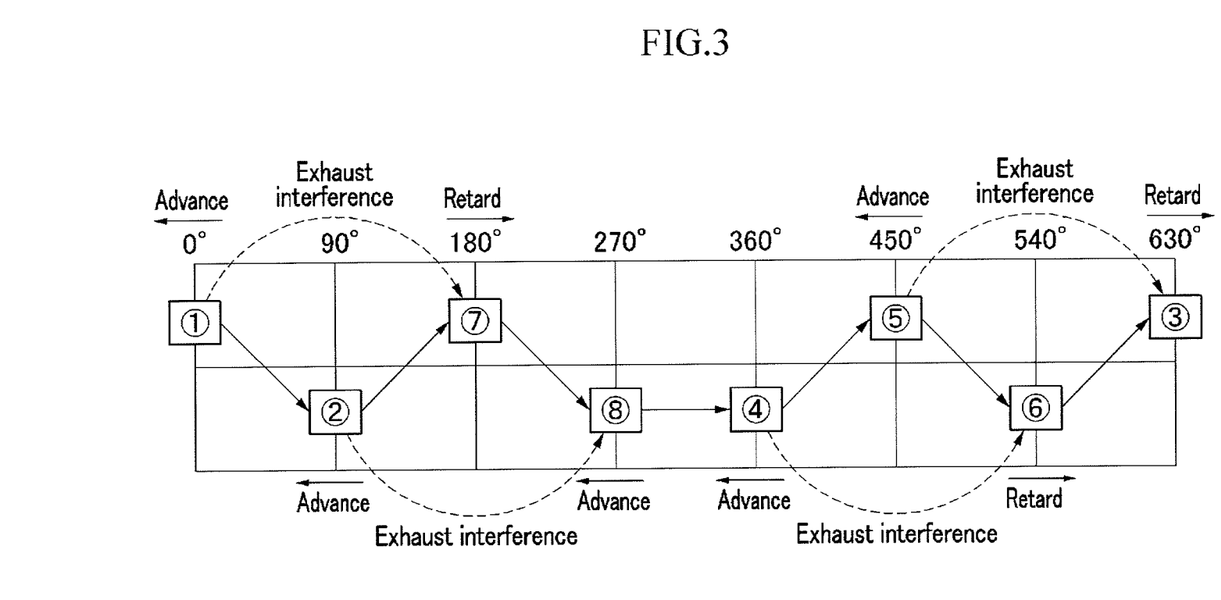
FIG. 3 is a diagram showing angles between exhaust cams of cylinders in an exemplary exhaust valve control system according to the present invention.

FIG. 1 is a top plan view showing the arrangement of a common 8-cylinder engine, FIG. 2 is a view showing a camshaft and a cam of the 8-cylinder engine of FIG. 1, and FIG. 3 is a diagram showing angles between exhaust cams of cylinders in an exhaust valve control system according to various embodiments of the present invention.

Referring to FIGS. 1 and 2, the 8-cylinder engine shown in FIGS. 1 and 2 has two banks with four cylinders, in which the banks (1 bank and 2 bank) includes exhaust camshafts 10 and 20 and intake camshafts 30 and 40, respectively, and four pairs of cams fit on the exhaust camshafts 10 and 20 and the intake camshafts 30 and 40, respectively.

The banks include a first bank (1 bank) and a second bank (2 bank). A first cylinder (1 cyl), a third cylinder (3 cyl), a fifth cylinder (5 cyl), and a seventh cylinder (7 cyl) are sequentially arranged in the first bank (1 bank) while a second cylinder (2 cyl), a fourth cylinder (4 cyl), a sixth cylinder (6 cyl), and a eighth cylinder (8 cyl) are sequentially arranged in the second bank (2 bank).

Exhaust cams 1, 3 and 5, 7 are disposed on the exhaust camshaft 10 of the first bank (1 bank) for the cylinders, respectively, and exhaust cams 2,4 and 6,8 are disposed on the exhaust camshaft 20 of the second bank (2 bank) for the cylinders, respectively.

Ignition is generated in the order of the first cylinder (1 cyl), the second cylinder (2 cyl), the seventh cylinder (7 cyl), the eighth cylinder (8 cyl), the fourth cylinder (4 cyl), the fifth cylinder (5 cyl), the sixth cylinder (6 cyl), and the third cylinder (3 cyl), in the engine.

Exhaust interference is generated at every 180° in the same banks in the engine in this process. Exhaust interference occurs between the first cylinder (1 cyl) and the seventh cylinder (7 cyl) and between the fifth cylinder (5 cyl) and the third cylinder (3 cyl) in the first bank (1 bank), and exhaust interference occurs between second cylinder (2 cyl) and the eighth cylinder (8 cyl) and between the fourth cylinder (4 cyl) and the sixth cylinder (6 cyl) in the second bank (2 bank).

The exhaust cams under the exhaust interference are called base cams. A method of setting an angle between exhaust cam profiles of cylinders that can minimize exhaust interference is described on the basis of the base cams.

An available range of the engine speed (rpm) is determined and the engine speed (rpm) is specified at regular intervals within the available range. That is, since it is impossible to perform modeling analysis throughout the available range, modeling analysis is specified and performed for each engine speed (rpm) at regular intervals.

Once the engine speed (rpm) is specified, design model analysis, that is, modeling analysis is performed by applying advance and retard for the base cam in accordance with the number of cases to the exhaust cams of the cylinder in accordance with the specified engine speed (rpm). In detail, when four pairs of cams fit on one camshaft, the number of cases of advance and retard are applied to the cams, such as applying advance to all the cams, applying retard to all the cams, or applying advance to only one pair of cams.

A map composed of an exhaust cam timing and a charging efficiency for each cylinder and each engine speed (rpm) is made on the basis of the analysis result of the modeling. This is because the overlap section of the intake valve and the exhaust valve changes in accordance with the exhaust cam timing, exhaust interference correspondingly changes, and the charging efficiency also changes.

The modeling analysis is performed and the map is made for each engine speed (rpm), and accordingly, a map is made by specifying an engine speed (rpm) within the available range and performing modeling analysis on the engine speed (rpm), and then by specifying another engine speed (rpm) and performing modeling analysis on the engine speed (rpm).

This process is repeated within the available range of engine speed (rpm) in accordance with the specifications of the engine.

The angles between the exhaust cam profiles of the cylinders are determined by the map made on the basis of the result of the modeling analysis. That is, in the exhaust cams of the banks, the angles between the exhaust cam profiles of the cylinders are determined in consideration of the overlap section, exhaust interference, charging efficiency, torque balance, and the like of the intake/exhaust valves.

An exhaust valve control system where the angles between the exhaust cam profiles of cylinders which are obtained from the modeling analysis and the map based on the modeling analysis are applied will be described hereafter as various embodiments of the present invention.

FIG. 3 is a diagram showing angles between exhaust cams of cylinders in an exhaust valve control system according to various embodiments of the present invention.

Referring to FIG. 3, the exhaust valve control system of an engine relates to an 8-cylinder engine that includes the first bank including the first, third, fifth, and seventh cylinders and the second bank including the second, fourth, sixth, and eighth cylinders.

In the exhaust valve control system of an engine, the angle between the exhaust cam profiles of the first cylinder and the seventh cylinder in the first bank is different by a predetermined angle or more from 180°. That is, the angle between the exhaust cam profiles of the first cylinder and the seventh cylinder in the first bank exceeds 180°.

According to an example, the exhaust cam profile of the first cylinder is advanced by a first predetermined angle from the base cam and the exhaust cam profile of the seventh cylinder is retarded by a second predetermined angle from the base cam. In other words, when the exhaust cam profile of the first cylinder is retarded by a first predetermined angle and the exhaust cam profile of the seventh cylinder is advanced by a second predetermined angle, the interface becomes 180°.

That is, the predetermined angle is the sum of the first predetermined angle and the second predetermined angle.

In detail, the angle between the exhaust cam profiles of the first cylinder and the seventh cylinder obtained from the modeling analysis and the map made on the basis of the modeling analysis is 188.7°. In particular, in an engine in which the interval becomes 180° when the exhaust cam profile of the first cylinder is retarded by 6.6° and the exhaust cam profile of the seventh cylinder is advanced by 2.1°, the exhaust interference between the first cylinder and the seventh cylinder is minimized.

Further, in the exhaust valve control system of an engine, the angle between the exhaust cam profiles of the fifth cylinder and the third cylinder in the first bank is different by a predetermined angle or more from 180°. That is, the angle between the exhaust cam profiles of the fifth cylinder and the third cylinder in the first bank exceeds 180°.

According to an example, the exhaust cam profile of the fifth cylinder is advanced by a first predetermined angle from the base cam and the exhaust cam profile of the third cylinder is retarded by a second predetermined angle from the base cam. In other words, when the exhaust cam profile of the fifth cylinder is retarded by a first predetermined angle and the exhaust cam profile of the third cylinder is advanced by a second predetermined angle, the interface becomes 180°. That is, the predetermined angle is the sum of the first predetermined angle and the second predetermined angle.

In detail, the angle between the exhaust cam profiles of the fifth cylinder and the third cylinder obtained from the modeling analysis and the map made on the basis of the modeling analysis is 186°. In particular, in an engine in which the interval becomes 180° when the exhaust cam profile of the fifth cylinder is retarded by 4.6° and the exhaust cam profile of the third cylinder is advanced by 1.4°, the exhaust interference between the fifth cylinder and the third cylinder is minimized.

Further, in the exhaust valve control system of an engine, the angle between the exhaust cam profiles of the second cylinder and the eighth cylinder in the second bank is different by a predetermined angle or more from 180°. That is, the angle between the exhaust cam profiles of the second cylinder and the eighth cylinder in the second bank exceeds 180°.

According to an example, the exhaust cam profile of the second cylinder is retarded by a first predetermined angle from the base cam and the exhaust cam profile of the eighth cylinder is advanced by a second predetermined angle from the base cam. In other words, when the cam profile of the second cylinder is advanced by a first predetermined angle and the exhaust cam profile of the eighth cylinder is retarded by a second predetermined angle, the interface becomes 180°. That is, the predetermined angle is the sum of the first predetermined angle and the second predetermined angle.

In detail, the angle between the exhaust cam profiles of the second cylinder and the eighth cylinder obtained from the modeling analysis and the map made on the basis of the modeling analysis is 186°. In particular, in an engine in which the interval becomes 180° when the exhaust cam profile of the second cylinder is retarded by 6.3° and the exhaust cam profile of the eighth cylinder is retarded by 0.3°, the exhaust interference between the second cylinder and the eighth cylinder is minimized.

Further, in the exhaust valve control system of an engine, the angle between the exhaust cam profiles of the fourth cylinder and the sixth cylinder in the second bank is different by a predetermined angle or more from 180°. That is, the angle between the exhaust cam profiles of the fourth cylinder and the sixth cylinder in the second bank exceeds 180°.

According to an example, the exhaust cam profile of the fourth cylinder is advanced by a first predetermined angle from the base cam and the exhaust cam profile of the sixth cylinder is retarded by a second predetermined angle from the base cam. In other words, when the exhaust cam profile of the fourth cylinder is retarded by a first predetermined angle and the exhaust cam profile of the sixth cylinder is advanced by a second predetermined angle, the interface becomes 180°. That is, the predetermined angle is the sum of the first predetermined angle and the second predetermined angle.

In detail, the angle between the exhaust cam profiles of the fourth cylinder and the sixth cylinder obtained from the modeling analysis and the map made on the basis of the modeling analysis is 188.5°. In particular, in an engine in which the interval becomes 180° when the exhaust cam profile of the fourth cylinder is retarded by 6.3° and the exhaust cam profile of the sixth cylinder is advanced by 2.2°, the exhaust interference between the fourth cylinder and the sixth cylinder is minimized.

The result and effect under the assumption that the exhaust cam where the angles between the exhaust cam profiles of the cylinders are applied is an overlap change cam.

Figure 4:
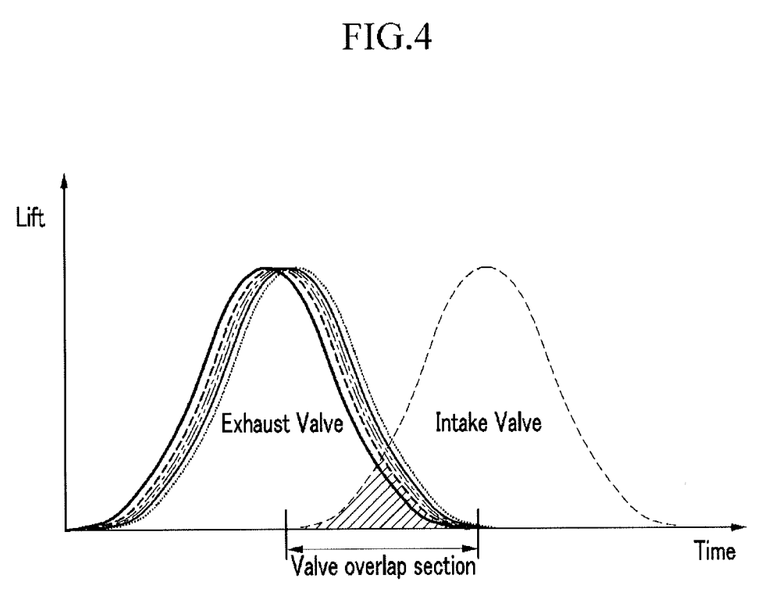
FIG. 4 is a diagram showing an exemplary relationship between an exhaust valve and an intake valve according to the present invention.
Figure 5:
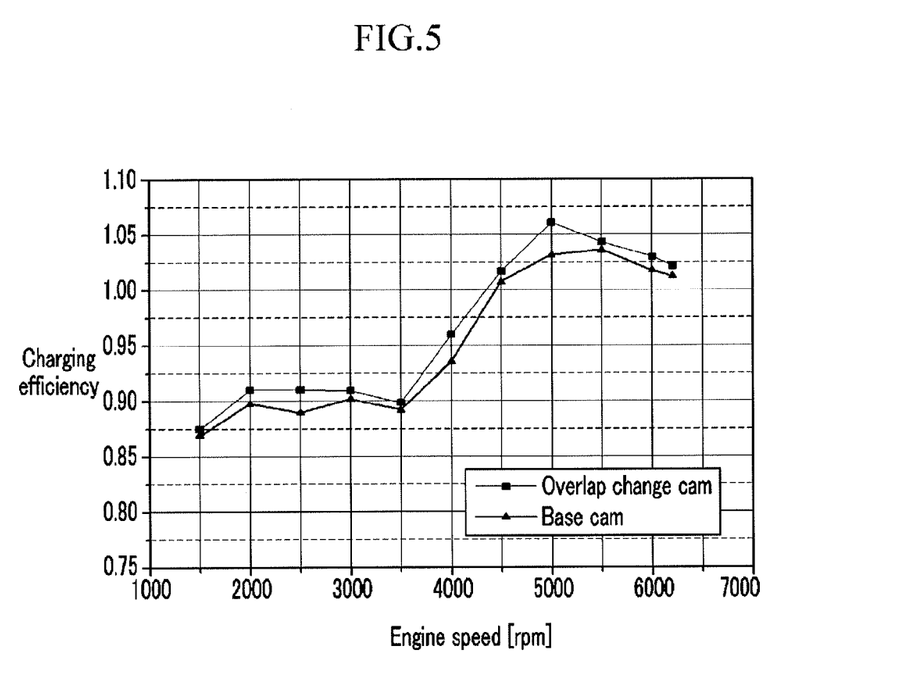
FIG. 5 is a table showing a result of charging efficiency analysis of an exhaust cam for each engine speed (rpm).
Figure 6:
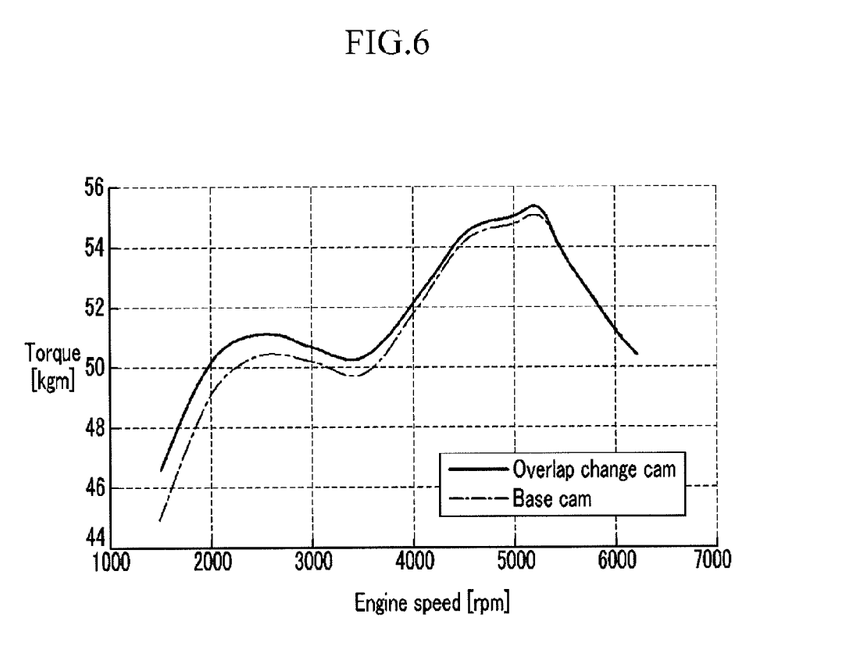
FIG. 6 is a table showing a torque of an exhaust cam for each engine speed (rpm).

FIG. 4 is a diagram showing the relationship between an exhaust valve and an intake valve according to various embodiments of the present invention, FIG. 5 is a table showing the result of charging efficiency analysis of an exhaust cam for each engine speed (rpm), and FIG. 6 is a table showing torque of an exhaust cam for each engine speed (rpm).

Referring to FIG. 4, it can be seen that the timings of the exhaust valves of the cylinders are different and the overlap sections between the intake valves and the exhaust valves are different. That is, as the angles between the exhaust cam profiles of the cylinders change, the timings of the exhaust valves of the cylinders become different and the overlap sections also become different. However, the lifts and profiles of the valves are the same.

Referring to FIGS. 5 and 6, it can be seen that the overlap change cam is higher in charging efficiency and torque than the base cam. In particular, it can be seen that the charging efficiency and the torque are improved in a low/middle speed section of engine speed of 3500 rpm or less.

That is, in the overlap change cam, when the angle between the exhaust cam profiles of any two cylinders in the first and second banks exceeds 180°, the overlap section between the intake valve and the exhaust valve becomes different and exhaust interference is also minimized. That is, as the exhaust interference is minimized, changing efficiency of the fuel sucked into the cylinder is improved and the engine torque is correspondingly improved.

For convenience in explanation and accurate definition in the appended claims, the terms front, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust valve control system of an engine comprising a plurality of cylinders divided into a first bank and a second bank,
wherein an angle between respective exhaust cam profiles of at least two sequentially ignited cylinders in the first bank differs by more than 180°, and
wherein the angle between respective exhaust cam profiles of at least two sequentially ignited cylinders in the second bank differs by more than 180°.

2. The system of claim 1, wherein:
profiles and lifts of exhaust cams of the plurality of cylinders in the first bank are the same.

3. The system of claim 1, wherein:
profiles and lifts of exhaust cams of the plurality of cylinders in the second bank are the same.

4. The system of claim 1, wherein:
the engine is an 8-cylinder engine in which the first bank includes first, third, fifth, and seventh cylinders sequentially from a front of the engine, and the second bank includes second, fourth, sixth, and eighth cylinders sequentially from the front of the engine,
the angle between the exhaust cam profiles of the first cylinder and the seventh cylinder in the first bank is different by a first predetermined angle and a second predetermined angle or more from 180°, and
when the exhaust cam profile of the first cylinder is retarded by the first predetermined angle, and
the exhaust cam profile of the seventh cylinder is advanced by the second predetermined angle, the angle between the profiles is 180°.

5. The system of claim 1, wherein:
the engine is an 8-cylinder engine in which the first bank includes first, third, fifth, and seventh cylinders sequentially from the front of the engine and the second bank includes second, fourth, sixth, and eighth cylinders sequentially from the front of the engine,
the angle between the exhaust cam profiles of the fifth cylinder and the third cylinder in the first bank is different by a first predetermined angle and a second predetermined angle or more from 180°, and
when the exhaust cam profile of the fifth cylinder is retarded by the first predetermined angle and
the exhaust cam profile of the third cylinder is advanced by the second predetermined angle, the angle between the profiles is 180°.

6. The system of claim 1, wherein:
wherein the engine is an 8-cylinder engine in which the first bank includes first, third, fifth, and seventh cylinders sequentially from the front of the engine and the second bank includes second, fourth, sixth, and eighth cylinders sequentially from the front of the engine,
the angle between the exhaust cam profiles of the second cylinder and the eighth cylinder in the second bank is different by a first predetermined angle and a second predetermined angle or more from 180°, and
when the exhaust cam profile of the second cylinder is retarded by the first predetermined angle and
the exhaust cam profile of the eighth cylinder is retarded by the second predetermined angle, the angle between the profiles is 180°.

7. The system of claim 1, wherein:
wherein the engine is an 8-cylinder engine in which the first bank includes first, third, fifth, and seventh cylinders sequentially from the front of the engine and the second bank includes second, fourth, sixth, and eighth cylinders sequentially from the front of the engine,
the angle between the exhaust cam profiles of the fourth cylinder and the sixth cylinder in the second bank is different by a first predetermined angle and a second predetermined angle or more from 180°, and
when the exhaust cam profile of the fourth cylinder is retarded by the first predetermined angle and
the exhaust cam profile of the sixth cylinder is advanced by the second predetermined angle, the angle between the profiles is 180°.

* * * * *